UNITED STATES PATENT OFFICE.

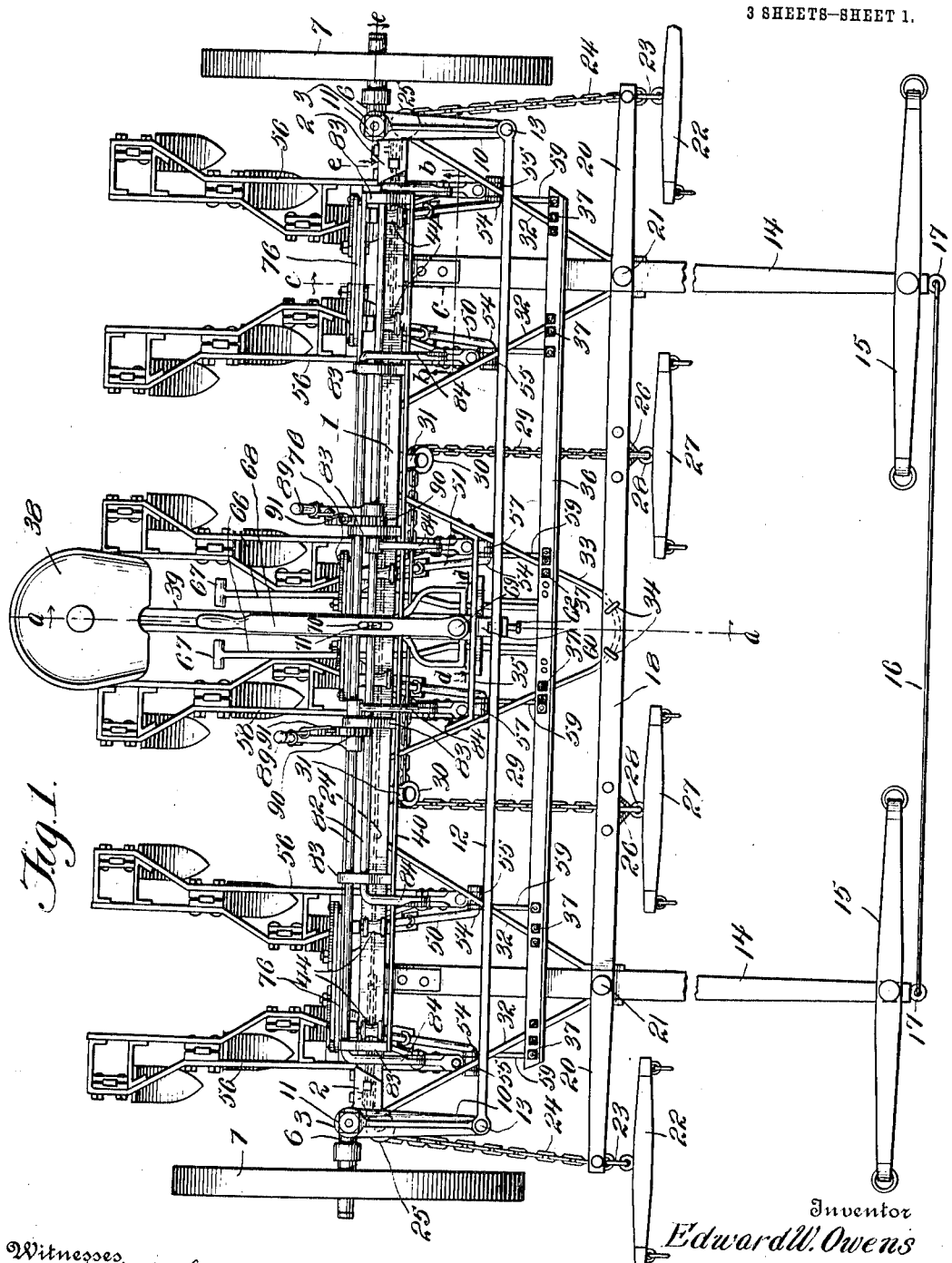

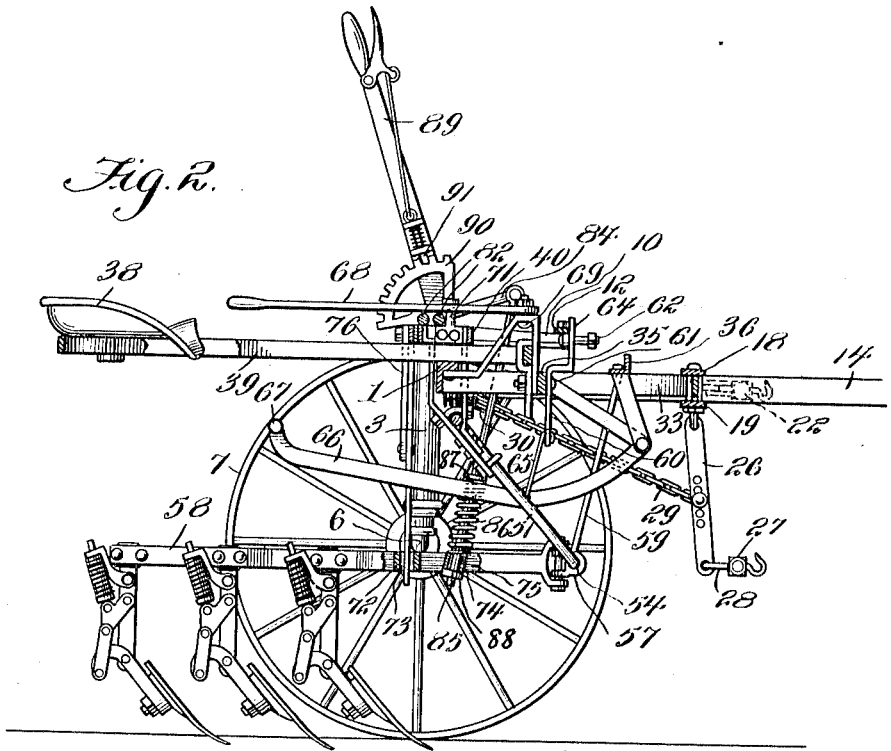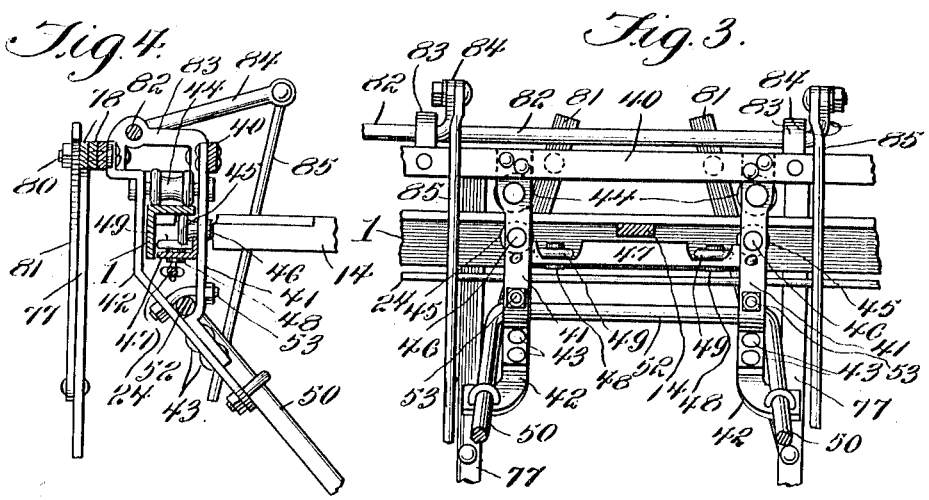

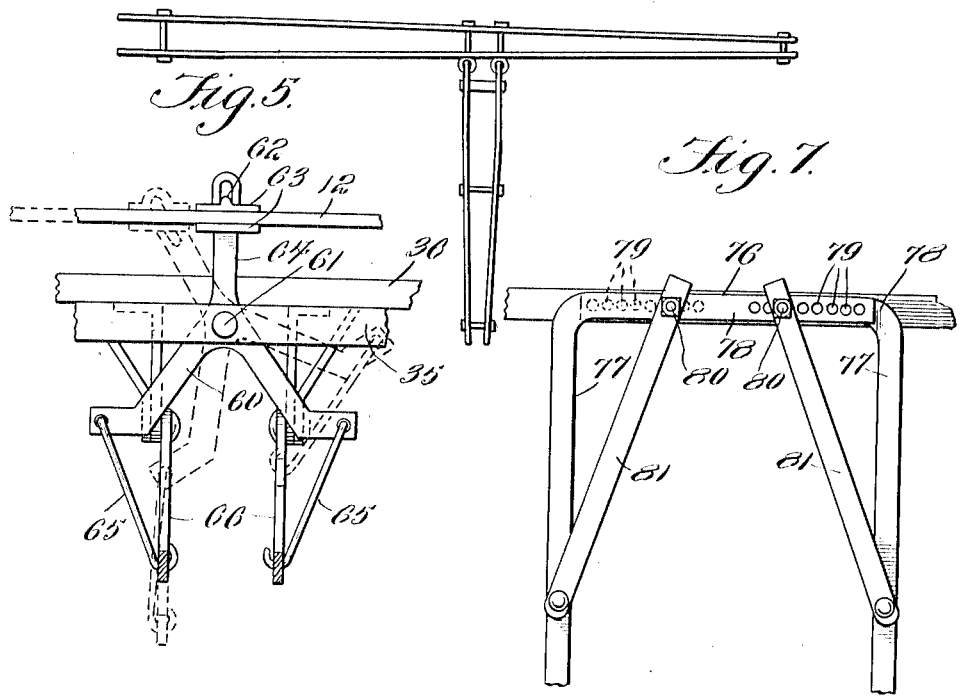

EDWARD W. OWENS, OF WAGNER, SOUTH DAKOTA.

THREE-ROW WHEEL CORN-CULTIVATOR.

1,105,450.   Specification of Letters Patent.   Patented July 28, 1914.

Application filed July 5, 1912. Serial No. 707,903.

*To all whom it may concern:*

Be it known that I, EDWARD W. OWENS, of Wagner, Charles Mix county, South Dakota, have invented certain new and useful Improvements in Three-Row Wheel Corn-Cultivators, of which the following is a full, clear, and exact description, reference being had to the accompanying drawings, forming a part thereof.

This invention is an improved three-row cultivator for cultivating corn and other like crops and consists in the construction, combination and arrangement of devices hereinafter described and claimed.

The object of my invention is to provide an improved machine of this character which may be used for cultivating three rows of corn or other crop simultaneously.

Another object is to effect improvements in the construction of the main frame of the machine.

Another object is to combine with the main frame shiftable frames or trucks which are movable laterally on the main frame and which carry the gangs of cultivators.

Another object is to provide improved means for shifting the gangs of cultivators laterally and for also guiding or directing the machine so as to keep the cultivators at all times at work on opposite sides of and between the rows of plants and prevent the rows of plants from being plowed under or otherwise injured.

In the accompanying drawings:—Figure 1 is a plan of a three-row cultivator constructed in accordance with my invention. Fig. 2 is a vertical transverse sectional view of the same on the plane indicated by the line *a—a* of Fig. 1. Fig. 3 is a partial vertical longitudinal sectional view of the same on the plane indicated by the line *b—b* of Fig. 1. Fig. 4 is a detail vertical transverse sectional view on the plane indicated by the line *c—c* of Fig. 1. Fig. 5 is a detail sectional view on the plane indicated by the line *d—d* of Fig. 1. Fig. 6 is a similar view on the plane indicated by the line *e—e* of Fig. 1. Fig. 7 is a detail rear elevation of a pair of the guide yokes for vertically guiding the cultivator beams. Fig. 8 is a detail perspective view of one of the cultivator beams. Fig. 9 is a detail elevation of the draft bars and one of the swinging links.

I will first describe the main frame of my improved corn cultivator.

The axle beam 1 is here shown as an angle bar and is provided at its ends with brackets 2 which are bolted or riveted thereto and each of which has a tubular pivotal boxing or bearing 3 in which is pivotally mounted the vertical arm 4 of a right-angled axle 5, each right-angled axle being provided with a horizontal spindle 6 at its lower end, a pair of ground wheels 7 being mounted on the said spindles. The upper end of the vertical arm 4 of each right-angled axle is provided with a squared portion 8 which fits in a correspondingly shaped opening 9 in a steering arm 10, the steering arms being secured in place by means of nuts 11.

A steering bar 12 is pivotally connected as at 13 to the front ends of the steering arms. Hence, the ground wheels are kept always parallel and may be turned axially in unison to direct the machine laterally in either direction as may be required.

A pair of poles 14 which are suitably spaced apart a distance corresponding to the width of three corn rows, have their rear ends secured to the axle beam and have neck yokes 15 at their front ends and are connected together by a rod 16 which is engaged with eyes 17. These poles are arranged in line with the spaces between the members of the outer gangs of cultivators hereinafter described. The poles are provided with draft bars 18 and 19, swinging links 23 and 26 and outer swingletrees 22 and swingletrees 27 said swingletrees being connected to said swinging links and the outer links 23 are connected together by an equalizing chain 24 which engages pulleys 25 and the inner links 26 are connected by a similar chain 29 which engages pulleys 30. Brace rods 32 are secured to the poles 14 and to the axle beam.

At the center of the main frame is a substantially V-shaped brace 33, the front portion of which is secured to the bar 18 as at 34, the rear ends of the said brace being secured to the axle beam 1. A supporting bar 35 connects the arms of the brace 33. A bar 36 is arranged parallel with the axle beam, a suitable distance in front thereof and is secured to the braces 32 and 33 as at 37. A seat 38, for the driver is secured on the rear end of a standard 39, the front end of the standard being secured to the supporting arm 35.

A truck 40 is mounted for movement on the axle beam 1, transversely with reference to the machine and is provided with downwardly extending front and rear hangers 41—42, respectively, the lower portions of the rear hangers being bent forwardly and downwardly and the said rear hangers being secured to the front hangers as at 43.

Supporting rollers 44, which bear and operate on the upper side of the axle beam have their bearings in the front and rear hangers. Retaining rollers 45 bear against the underside of the upper, horizontal web of the axle beam and are mounted on studs 46 which are carried by the front hangers and extend rearwardly therefrom and are provided with vertical studs 48 on which are mounted horizontally arranged guide rollers 49 which bear on the front side of the vertical web of the axle beam. The rollers 44, 45, 48 and 49 enable the truck, with the gangs of cultivators which it carries as hereinafter described, to be readily moved transversely of the machine and on the wheel axle.

At the ends of the truck 40 are U-bars 50 and at the center of the truck is a U-bar 51. These U-bars are arranged with their upper connecting portions 52 in the angles between the lower ends of the hangers 41—42 and secured to the said hangers by means of bolts or other suitable devices 53. The arms of the U-bars are inclined, extend downwardly and forwardly, diverge forwardly and are also provided with outwardly extending horizontally arranged spindles 54. The front ends of the beams 55 of pairs of side cultivators 56 are pivotally connected to the spindles 54 of the end or side U-bars 50 and the front end of the beams 57 of the pair of central cultivators 58 are similarly pivoted on the spindles of the central U-bar 51. Hence, the gangs or pairs of cultivators are carried by the laterally movable truck and are mounted for angular movement in a vertical plane so that the rear ends of the beams of the cultivators with their cultivating shovels or other earth working or soil stirring implements may be raised and lowered to enable the cultivators to work as deeply into the ground as may be desired or to be raised entirely therefrom as when turning the machine around at the ends of the rows.

The members of the pairs of side cultivators are arranged on opposite sides of the poles 14 and the members of the pair of central cultivators are arranged on opposite sides of the center of the machine, the poles 14 running directly above the two outer rows of plants when the machine is in operation, and the center of the machine running directly over the center row so that the horses attached to the singletrees 22—27 walk in the spaces between the rows, and the driver rides directly above the center row as will be understood upon reference to Fig. 1 of the drawings. Hence the machine can be readily directed to keep the members of the pairs of cultivators on opposite sides of and in the spaces between the rows, and avoid injuring the growing plants. Draft rods 59 have their front ends pivotally connected to the bars 36 and their lower, rear ends connected to the spindles of the U-bars, the said draft rods serving to brace the U-bars and also to exert draft stress thereon and on the cultivators attached thereto.

The substantially inverted Y-shaped rocker 60 is pivotally mounted on the center of the supporting bar 35 as at 61 and has its upper end pivotally connected as at 62 to a pair of brackets 63 which are secured to and depend from the steering bar 12, the pivot 62 playing loosely in a slot in which the upper arm of the rocker 64 is provided. The downwardly diverging arms 64 of the rocker are connected by rods 65 to a pair of foot levers 66 which extends rearwardly of the axle beam and truck are pivotally connected as at $66^a$ to hangers $66^b$ which depend from the bar 36 and are provided with stirrups or pedals 67 at their rear ends. These foot levers are arranged at opposite sides of the seat so that the driver can readily keep his feet on the stirrups or pedals and by depressing one or the other, as the case may be cause the rocker to move the steering bars endwise so as to turn the right-angled axles 14 and, hence, direct the ground wheels and the machine laterally in either direction required.

A hand lever 68 for shifting the truck and, hence, also the gangs of cultivators is pivotally connected at its front end to the support as at 69 and is provided with a slot 70 which receives a pivot 71 that projects upwardly from the center of the truck. Each cultivator beam includes a cross bar 72 which has a vertical guide opening 73, each beam also including a cross bar 74 which has a vertical opening 75. An inverted U-shaped guide yoke 76 is employed in connection with each pair of cultivator beams, each of the guide yokes comprising a pair of inverted reversely arranged L-shaped members 77, the upper arms 78 of which are arranged in overlapped relation and provided with a series of adjusting openings 79 and secured, by bolts 80 to the rear side of the truck, so that the said guide yokes extend downwardly to the rear of the axle beam. Owing to the provision of the overlapping arms 78 and adjusting openings 79, the members of the guide yokes are adjustably secured together so that each guide yoke may be narrowed or widened as may be desired to lessen or increase the width between the members of the pairs of cultivators according to whether it be desired that the cultivating shovels shall run very close to or at some distance from opposite sides of the rows of plants.

Inclined braces 81 are provided, the upper ends of which are secured to the horizontal arms and the lower ends of which are secured to the vertical arms of the guide yokes. The lower portions of the vertical arms of the guide yokes pass through the openings 73 of the cultivator beams so that the latter are adapted to play vertically with respect to the guide yokes when the cultivators are raised or lowered in the manner and by the means hereinafter stated.

A pair of rock shafts 82 are mounted in suitable bearings 83 on the upper side of the truck 40. Each rock shaft has rock arms 84 above the beams of one of the side or outer gang of cultivators and one of the beams of the central gang of cultivators and to the front end of each of these rock arms is pivotally connected the upper end of a link rod 85. Each link bolt extends downwardly and is free to play vertically to some extent in the opening 75 of one of the cultivator beams. A cushioning spring 86 is on the lower portion of each link bolt, its upper end bears against a pin or other suitable stop 87 with which the link bolt is provided and its lower end bears on the upper side of the cross bar 74 of the cultivator beam. A suitable nut or other stop 88 is secured to the lower end of each link bolt.

Each rock shaft has an operating lever 89 whereby it may be turned to cause the cultivator beams connected thereto to be raised or lowered as will be understood and each lever with its rock shaft and the cultivator beams controlled thereby will be locked in adjusted position by means of a segment 90 on the truck 40 and a locking dog 91 with which the lever is provided. Owing to the provision of the springs 86, the cultivators are kept pressed downwardly by said springs when the cultivators are in lowered operating position but in the event of a stone or other obstruction being encountered while any of the cultivators are in operation, the spring 6 will permit said cultivators to rise sufficiently to clear the obstruction and, hence, avoid being injured thereby.

I claim:—

1. A cultivator of the class described comprising a main frame having ground wheels and draft devices, a truck mounted on the main frame for movement laterally thereof, cultivator beams pivotally connected at their front ends to the truck for angular movement in vertical planes, and guides extending downwardly from the truck and to which the cultivator beams are connected for vertical sliding movement.

2. A cultivator of the class described comprising ground wheels and draft devices, a truck mounted on the main frame for movement laterally thereof, said truck having downwardly extending bars on its front side and downwardly extending guides on its rear sides and cultivator beams pivotally connected at their front ends to said bars for vertical angular movement and slidably connected to said guides for vertical movement thereon.

3. A cultivator of the class described comprising ground wheels and draft devices, a truck mounted on the main frame for movement laterally thereof, said truck having downwardly extending bars on its front side and downwardly extending guides on its rear sides and cultivator beams pivotally connected at their front ends to said bars for vertical angular movement thereon, and means carried by said truck to raise and lower the cultivator beams.

4. A cultivator of the class described comprising a main frame having ground wheels and draft devices, a truck mounted on the main frame for movement laterally thereof, said truck having downwardly extending bars on its front side and downwardly extending guides on its rear side and cultivator beams pivotally connected at their front ends to said bars for vertical and also horizontal angular movement and slidably connected to said guides for vertical movement thereon, said guides being adjustable toward and from each other.

5. A cultivator of the class described comprising a main frame having an axle beam and also having draft devices and ground wheels, a truck mounted directly on the axle beam for lateral movement, means to shift the truck laterally, and earth working devices carried by and connected to the truck, said earth working devices being vertically movable and said truck having means mounted thereon and carried thereby to raise and lower the earth working devices.

In testimony whereof, I have affixed my signature, in the presence of two witnesses.

EDWARD W. OWENS.

Witnesses:
S. L. GABLE, Jr.,
H. W. EVERS.